(12) United States Patent
Gifford et al.

(10) Patent No.: US 6,688,611 B2
(45) Date of Patent: *Feb. 10, 2004

(54) REMOVABLE CHUCK

(75) Inventors: Robert H. Gifford, New Freedom, PA (US); Richard J. Heavel, Hanover, PA (US); Alfred H. Judge, Prescott Valley, AZ (US); Thomas T. Bludis, Cockeysville, MD (US); Gavin K F Ng, Sha Tin (HK); Peter L K Woo, Yuen Long (HK)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/812,745

(22) Filed: Mar. 20, 2001

(65) Prior Publication Data

US 2001/0050465 A1 Dec. 13, 2001

Related U.S. Application Data

(63) Continuation-in-part of application No. 09/782,812, filed on Feb. 14, 2001, which is a continuation-in-part of application No. 09/596,762, filed on Jun. 19, 2000, which is a continuation of application No. 09/167,305, filed on Oct. 6, 1998, now Pat. No. 6,079,716, which is a continuation-in-part of application No. 08/989,715, filed on Dec. 12, 1997, now Pat. No. 5,951,026.

(51) Int. Cl.⁷ .............................................. B23B 31/16
(52) U.S. Cl. ........................... 279/71; 279/75; 279/143; 279/145; 7/158; 7/165; 408/239 R

(58) Field of Search ........................ 279/71, 75, 143, 279/79, 80, 145; 408/239 R; 7/158, 165

(56) References Cited

U.S. PATENT DOCUMENTS

| 3,484,114 A | * | 12/1969 | Rodin .......................... 279/144 |
| 4,588,335 A | * | 5/1986 | Pearson, Jr. .................. 279/76 |
| 4,818,157 A | * | 4/1989 | Kouvelis ..................... 408/240 |
| 4,824,298 A | * | 4/1989 | Lippacher et al. ........... 408/240 |
| 4,906,147 A | * | 3/1990 | Friesinger et al. .......... 409/232 |
| 5,342,154 A | | 8/1994 | Holzer ........................ 408/240 |
| 5,437,465 A | * | 8/1995 | Vogele et al. ................. 279/22 |
| 5,470,084 A | * | 11/1995 | Reibetanz et al. ......... 279/19.3 |
| 5,481,949 A | | 1/1996 | Yen .............................. 81/438 |
| 5,603,516 A | | 2/1997 | Neumaier ................... 279/19.5 |
| 5,651,647 A | * | 7/1997 | Ray ........................ 408/239 R |
| 5,951,026 A | * | 9/1999 | Harman, Jr. et al. ........ 279/143 |
| 6,047,971 A | * | 4/2000 | Harman, Jr. et al. ........ 279/143 |
| 6,079,716 A | * | 6/2000 | Harman, Jr. et al. .......... 279/75 |
| 6,293,559 B1 | * | 9/2001 | Harman, Jr. et al. .......... 279/75 |

* cited by examiner

Primary Examiner—Monica S. Carter
(74) Attorney, Agent, or Firm—Harness, Dickey & Pierce, P.L.C.

(57) ABSTRACT

A removable chuck has a chuck member for holding a drill bit. Also, a mechanism is coupled with the chuck body to retain the chuck body to a drill spindle. The retention mechanism, in a first position, has at least one biased blade, in a non-biased condition, retaining the chuck on the drill spindle and in a second position, with the at least one biased blade in a biased condition, the chuck is enabled to be removed from the spindle.

18 Claims, 13 Drawing Sheets

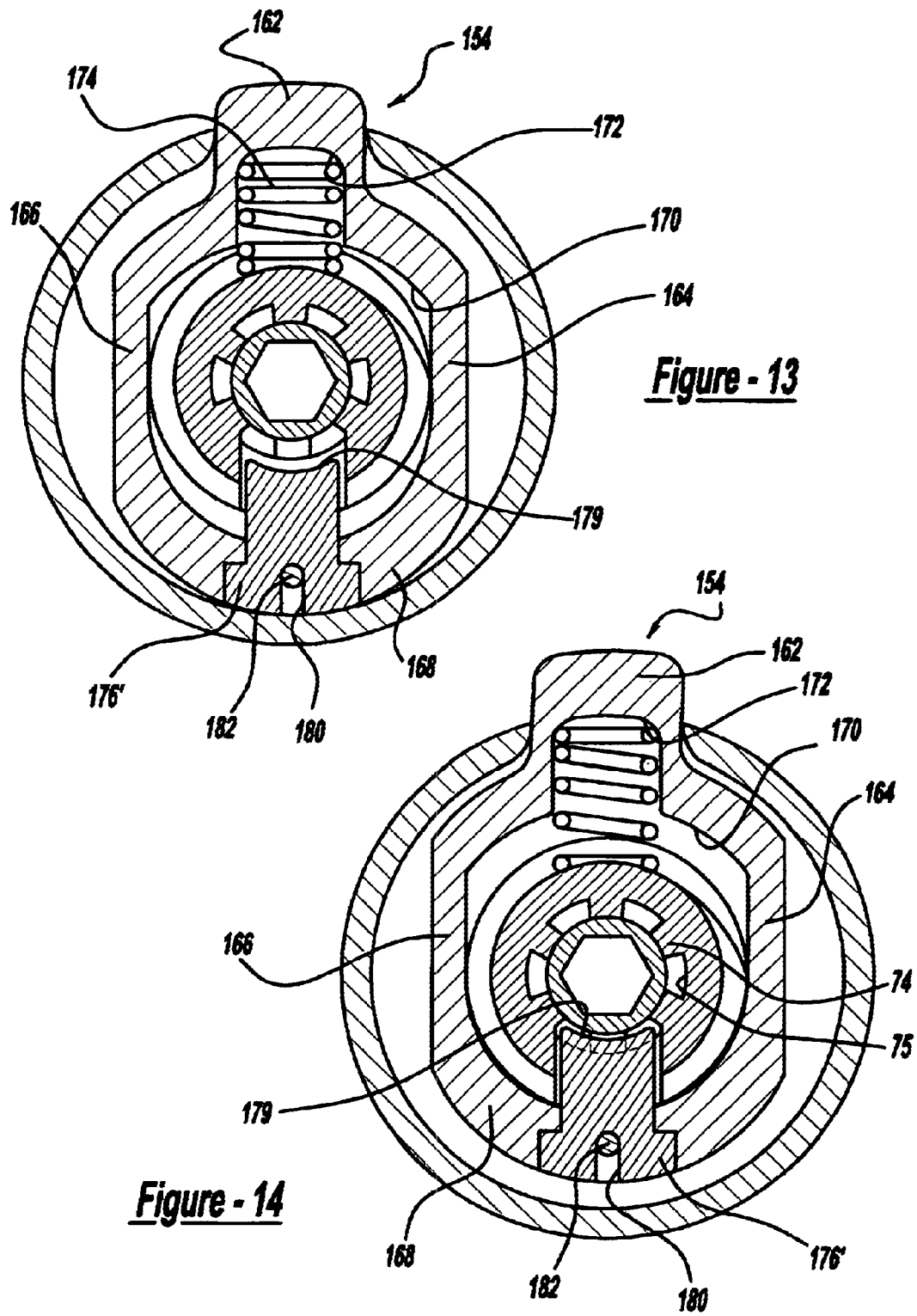

REMOVABLE CHUCK

CROSS-REFERENCE TO RELATED APPLICATION

This application is a continuation-in-part of application Ser. No. 09/782,812 filed Feb. 14, 2001; which is a continuation-in-part of application Ser. No. 09/596,762 filed Jun. 19, 2000; which is a continuation of application Ser. No. 09/167,305 filed on Oct. 6, 1998, now U.S. Pat. No. 6,079,716 issued Jun. 27, 2000; which is a continuation-in-part of application Ser. No. 08/989,715 filed on Dec. 12, 1997, now U.S. Pat. No. 5,951,026 issued Sep. 14, 1999, the specifications and drawings are herein expressly incorporated by reference.

FIELD OF THE INVENTION

The invention relates to rotatable tools such as drills, hammer drill, screwdrivers, and other power tools. More particularly, the present invention relates to a removable chuck for a hand-held tool.

BACKGROUND OF THE INVENTION

In the consumer market, it is desirable to use rotatable tools with a drill bit to form holes in a workpiece. Also, it is desirous to insert fasteners, such as screws with a regular or Phillips head into these holes to retain multiple workpieces together. Ordinarily, one uses the tool to drill the holes in the workpiece. After drilling the holes in the workpiece, the drill bit is removed from the chuck and a tool bit is inserted into the chuck for driving the fastener. While this has been an effective method for driving fasteners into the workpiece, it is burdensome and time consuming to continually drill holes, remove the drill bit from the chuck, and insert a tool bit into the chuck to drive the fastener. Generally, this process is continued while connecting several workpieces together. Further, this process has been carried out in the professional power tool devices. Thus, it would be desirable to provide a chuck with the drill bit, which is removable from the tool to expose a spindle, with a tool bit, on the tool to drive the fasteners.

SUMMARY OF THE INVENTION

Accordingly, it is an object of the present invention to provide a removable chuck assembly embodying the foregoing design objectives.

In accordance with a first aspect of the invention, a removable chuck comprises a sleeve adapted to connect with a rotatable spindle. A chuck body is coupled with the sleeve. A locking mechanism is adapted to retain the sleeve on the rotating spindle. The locking mechanism includes at least one locking blade to seat in a recess in the spindle. The at least one locking blade is movable from a first position, where the locking blade is in a non-biased condition, coupling the sleeve with the spindle, to a second position, where the locking blade is in a biased condition to enable decoupling from the spindle. Preferably, there are two locking blades. The locking mechanism includes a housing, two blade carriers coupled with the blades, a pair of actuation members coupled with the carriers, and biasing members biasing the carriers. The actuation members move the carriers against the biasing members between the first and second positions. The carriers and activation members include mating cam surfaces. Further, the locking member may include a yoke member with a single blade to engage the recess. A helical spring biases the yoke member to enable it to move between the first and second positions.

In accordance with a second aspect of the invention, a hand tool comprises a hand tool with a rotatable spindle. The spindle includes a recess. A removable chuck is coupled with the spindle. A sleeve couples the removable chuck with the rotatable spindle. A locking mechanism retains the sleeve on the rotatable spindle. The locking mechanism includes at least one locking blade to seat in the recess of the spindle. The at least one locking blade is movable from a first position, where the locking member is in a non-biased condition, coupling the sleeve with the spindle, to a second position, where the locking member is in a biased condition to enable decoupling from the spindle. Preferably, there are two locking blades. The locking mechanism includes a housing, two blade carriers coupled with the blades, a pair of actuation members coupled with the carriers, and biasing members biasing the carriers. The actuation members move the carriers against the biasing members between the first and second positions. The carriers and activation members include mating cam surfaces. Additionally, the locking member may include a yoke member with a single blade to engage the recess. A helical spring biases the yoke member to enable it to move between the first and second positions.

Additional objects and advantages of the invention will become apparent from the detailed description of the preferred embodiment, and the appended claims and accompanying drawings, or may be learned by practice of the invention.

BRIEF DESCRIPTION OF THE DRAWINGS

The accompanying drawings, which are incorporated in and constitute a part of the specification, illustrate the present invention and together with the description serve to explain the principles of the invention. In the drawings, the same reference numerals indicate the same parts.

FIG. 13 is a cross-section view along line 13—13 of FIG. 11 with the yoke in a depressed position.

FIG. 14 is a view like FIG. 13 with the yoke in a retention position.

DETAILED DESCRIPTION OF THE PREFERRED EMBODIMENT

Figure 1:
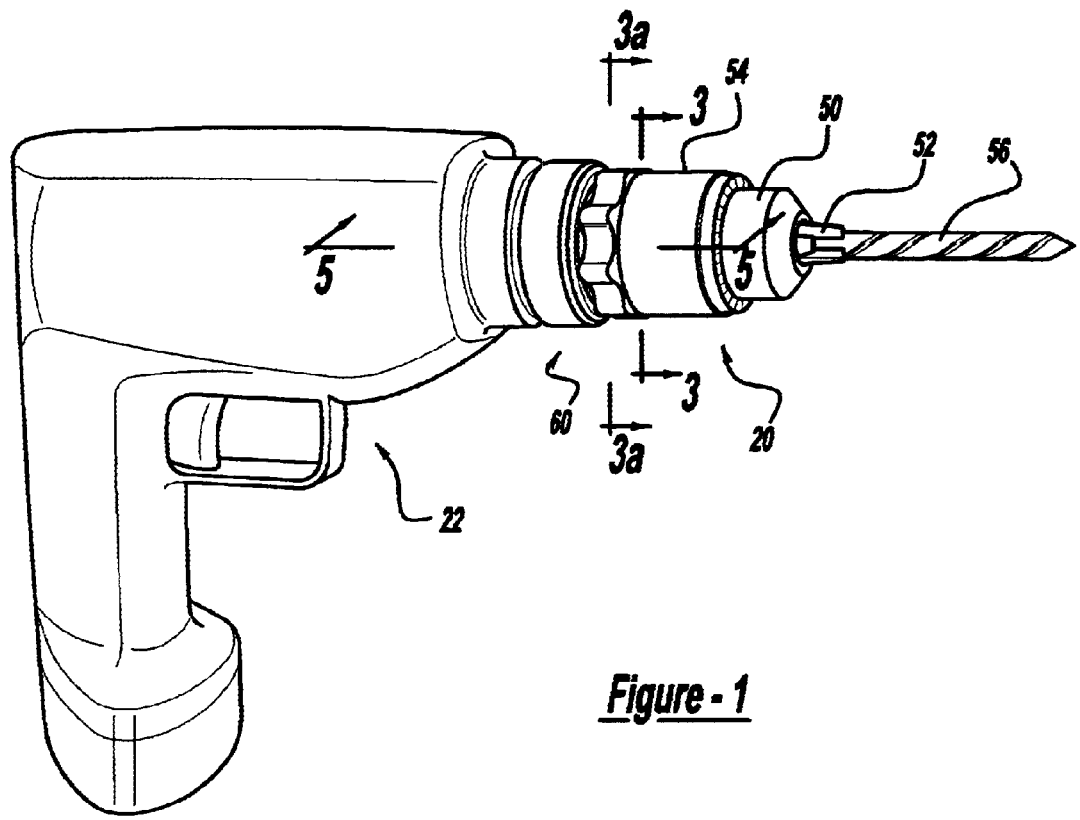
FIG. 1 is a perspective view of a tool with the removable chuck of the present invention.
Figure 2:
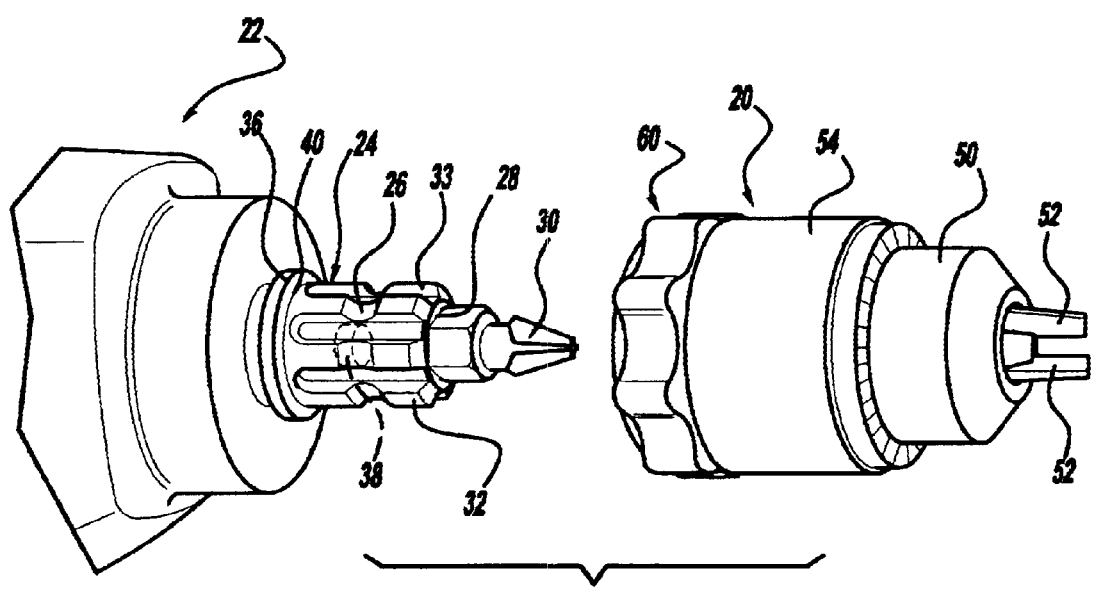
FIG. 2 is a perspective view of FIG. 1 with the chuck removed from the spindle.

Turning to the figures, particularly FIGS. 1–2, a removable chuck 20 is illustrated on a tool 22. In this particular embodiment, the tool 22 is a rotary drill, however a hammer drill or power screwdriver would work equally well. The drill 22 includes a spindle 24 which, in turn, includes an aperture 28 to receive a tool bit 30. The spindle 24 includes a circumferential groove 26 as well as a plurality of raised members 32 separated by axial channels 33. Also, a retaining ring 36 is received in a notch 40 on a shoulder surface in the spindle to prohibit additional rearward movement of the chuck 20 onto the spindle 24. A magnet 38 is positioned in the spindle 24 to magnetize the tool bit 30 as well as to retain the tool bit in the bore. Likewise, the raised members 32 and channels 33 provide the drive connection with the chuck 20. Other positive locking means may be located in the spindle to hold the tool bit.

The chuck 20 includes a body 50, jaw members 52 with a locking sleeve 54, which are conventional, to retain a drill bit 56 within the chuck 20. A retaining mechanism 60 is at the rear of the chuck body 50 to enable the chuck 20 to be secured with and removed from the spindle 24.

Figure 5:
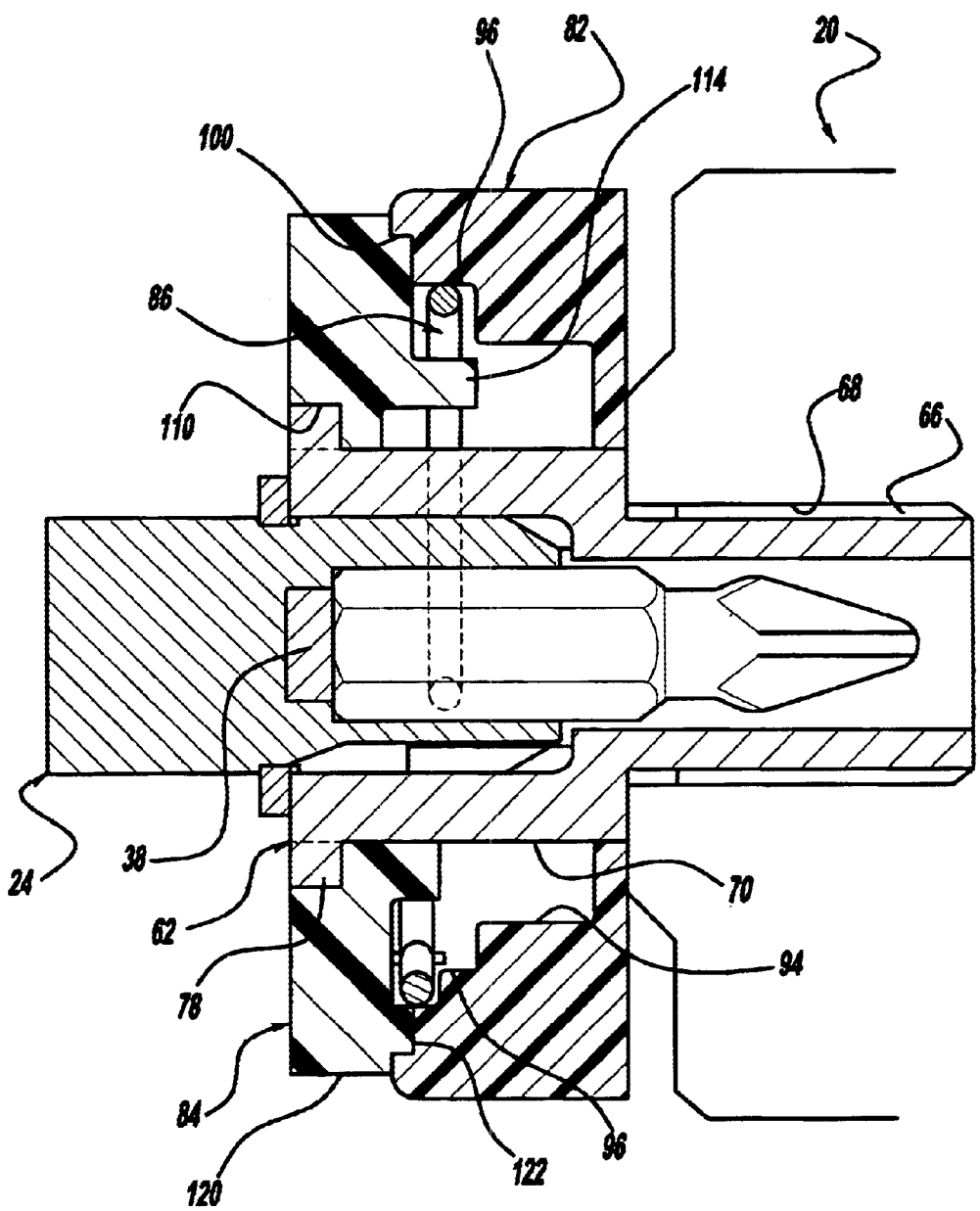
FIG. 5 is a cross-section view of FIG. 1 along line 5—5 thereof.
Figure 6:
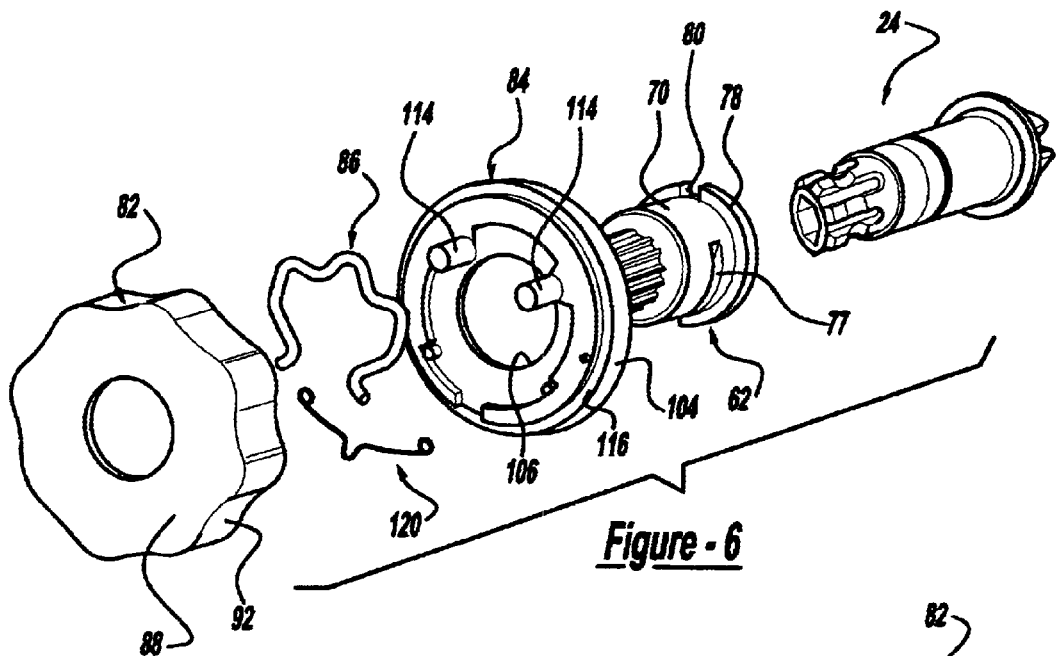
FIG. 6 is an exploded front perspective view of the locking member.
Figure 7:
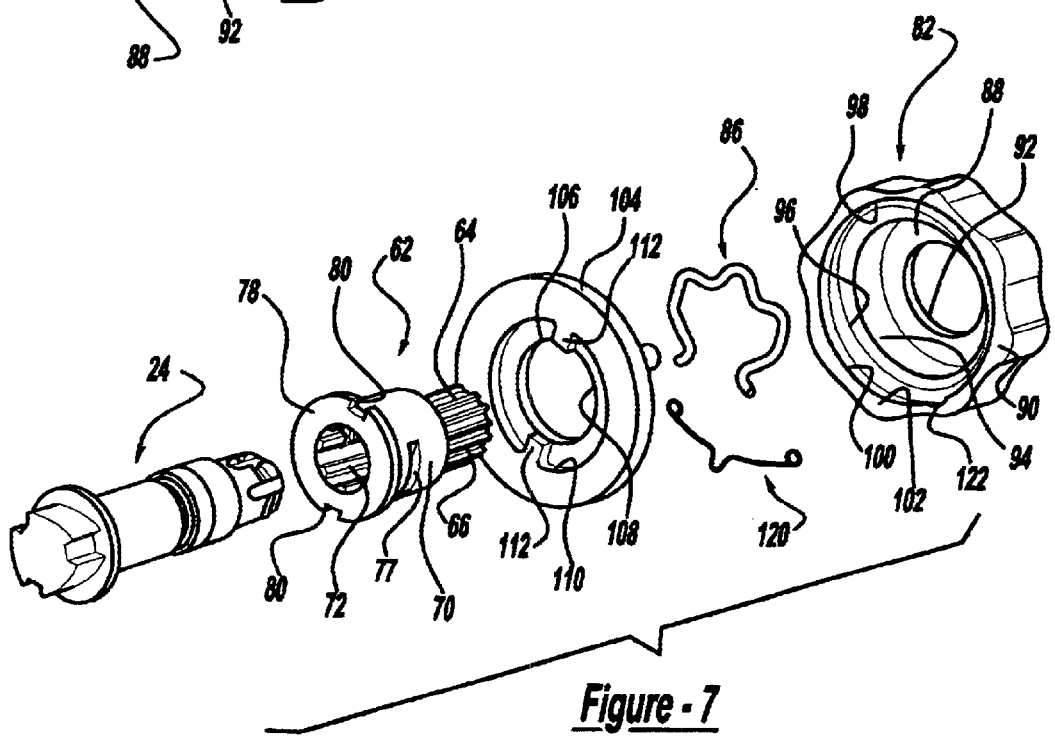
FIG. 7 is an exploded perspective rear view of the locking member.

The retention mechanism 60 includes a drive sleeve or spud 62. The spud 62 (best seen in FIGS. 5–7) has a first tubular portion 64 which may have a thread or the like 66 which is coupled with threaded bore 68 at the rear of the chuck body 50 to secure the spud 62 with the chuck body 50. The second tubular portion 70 of the spud 62 has bore 72 with corresponding raised members 74 and axial channels 75 on its interior surface to mate with the spindle 24. Arcuate slots 77 are formed through the second tubular portion to enable a biasing member to couple the spud 62 with the spindle 24.

The spud second portion 70 is followed by a flange 78. The flange 78 includes a pair of notches 80. The notches 80 are positioned 180° apart from one another.

The retention mechanism 60 also includes a first rotatable member 82, a second non-rotatable member 84 and a biasing member 86. The rotatable member 82 has an annular body 88 with an extending skirt 90. The skirt 90 includes a first diameter portion 92 which is sized to rest on the second tubular portion 70 of spud 62. A second diameter portion 94 provides a thin wall section to rotatable member 82 and therefore can be made with a plastic injection molding process. A third diameter portion 96 includes an eccentric cam surface 98. A fourth diameter portion 100 defines a mating ledge 102.

The non-rotatable member 84 includes an annular body 104. The annular body 104 has a bore 106 with a first diameter portion 108 resting on the spud second tubular portion 70 and a second diameter portion 110 to receive the spud flange 78. The second diameter portion 110 includes projecting tabs 112. The tabs 112 mate with the flange notches 80 to fix the non-rotatable member 84 with the spud 62.

At least one positioning projection 114 extends from the annular body 104. The projection 114 positions the biasing member 86. A mating ledge 116 extends from the annular body 104. The mating ledge 116 mates with receiving mating ledge 102 to enable coupling of the rotatable and non-rotatable members.

A spring latch 120 is mounted on the annular body 104. The latch 120 cooperates with a notch 122 in the fourth diameter portion 100. Thus, when the rotating member is rotated on the non-rotatable member, the latch 120 will snap into the notch 122 to indicate the first position of the locking mechanism. A rotational stop 124 also extends into the third diameter portion to prohibit over rotation.

Figure 3:
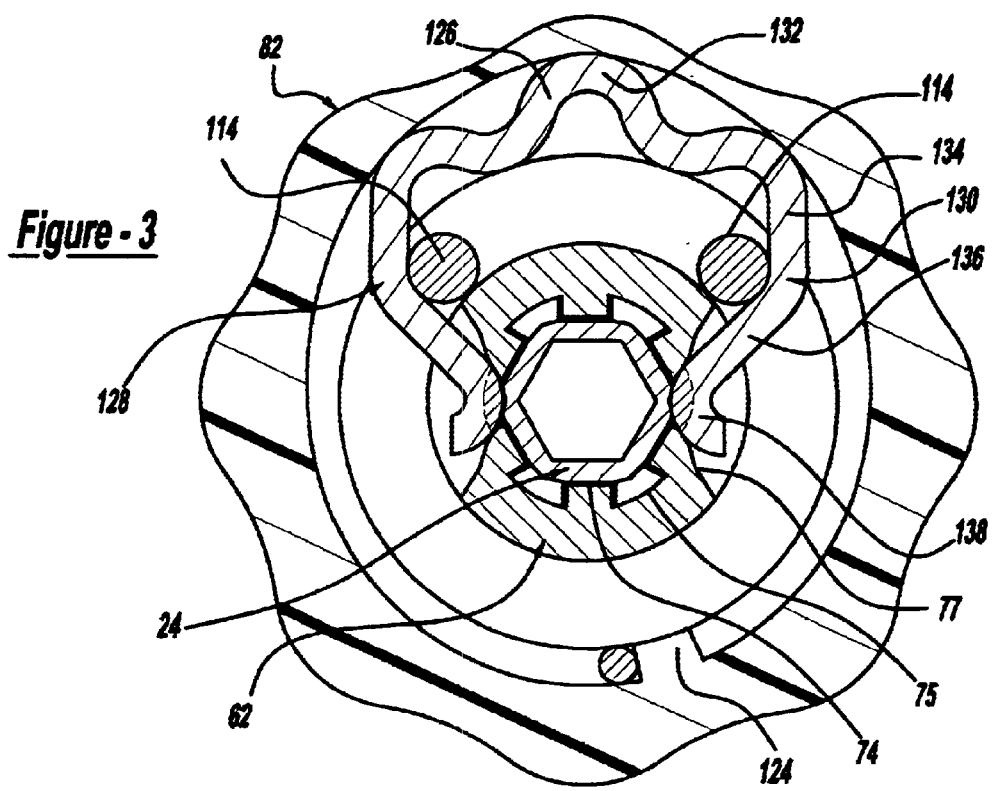
FIG. 3 is a cross-section view of FIG. 1 along line 3—3 thereof.
Figure 3A:
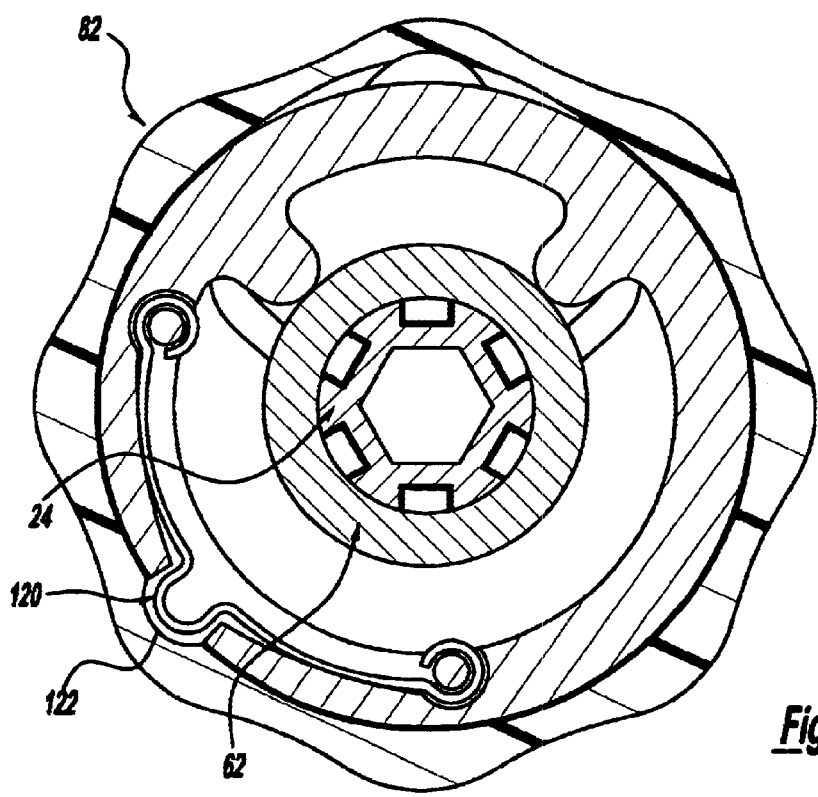
FIG. 3a is a cross-section view of FIG. 1 along line 3A—3A thereof.
Figure 4:
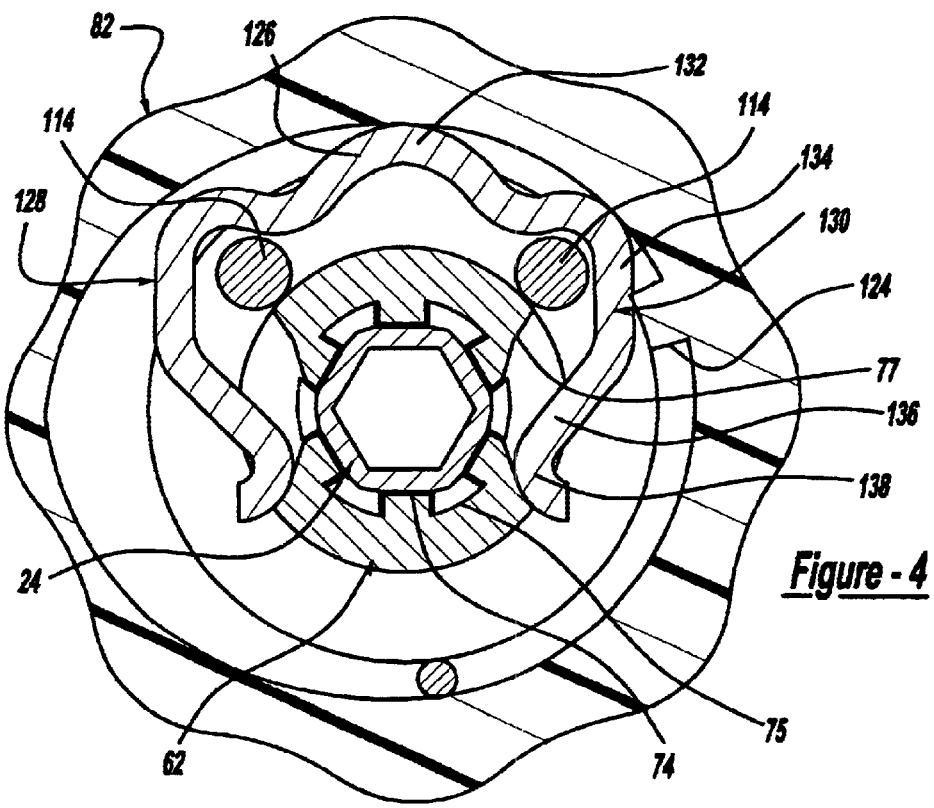
FIG. 4 is a cross-section view like that of FIG. 3 in a removable position.
Figure 4A:
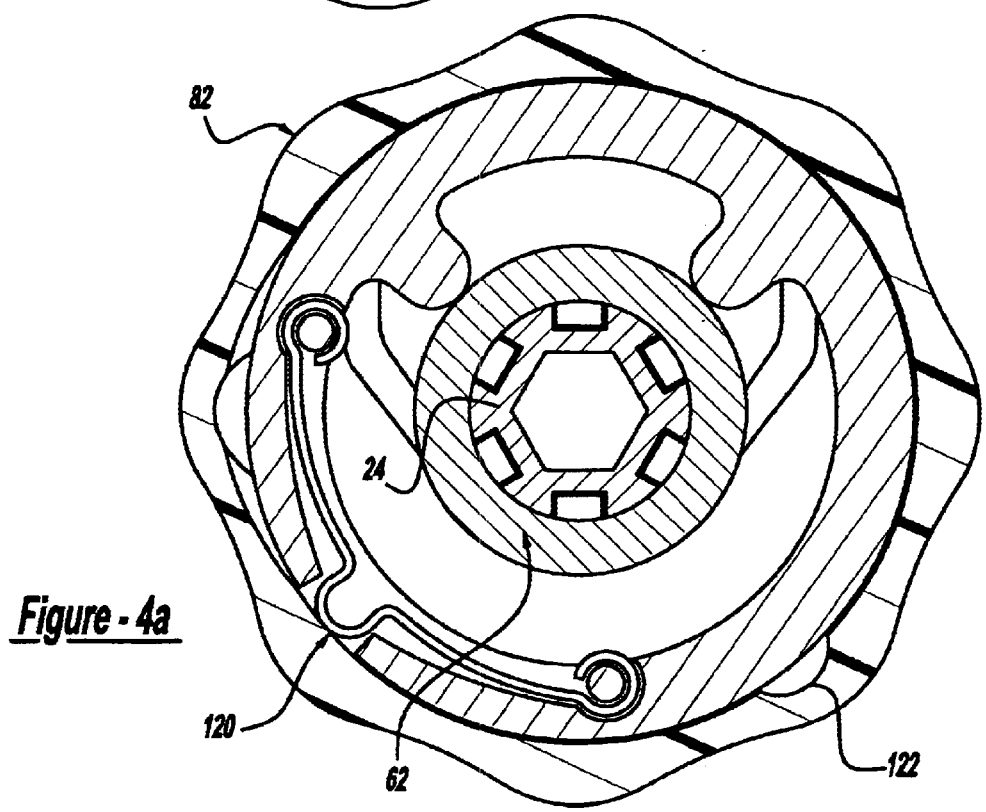
FIG. 4a is a cross-section view of FIG. 3A along line 4A—4A thereof.

The biasing member 86 has an overall inverted U-shape with a web 126 and legs 128 and 130. The biasing member 86 is made from a spring wire material. The web 126 includes a projection 132. The web may have a serpentine configuration as shown in FIG. 4. The legs 128 and 130 are mirror images of one another. The legs 128 and 130 include a first portion 134, a second angled portion 136 and a curved foot portion 138. The foot portion 138 fits into the slots 77 in the spud and recess in the spindle as illustrated in FIG. 3.

In use, the feet 138 rest in the spud 62 and spindle recesses 26 to couple the chuck 20 with the spindle 24. Thus, the chuck 20 is locked onto the spindle. As the rotatable member 82 is rotated, the cam surface 98 presses against the web 126 of biasing member 86. As this occurs, the biasing member feet 138 ride along the arcuate surface 79 of the spud slots 77 until the feet 138 pass outside of the spindle recess 26 as illustrated in phantom in FIG. 3. As this occurs, the chuck may be removed from the spindle. Rotating the rotatable member 82 in a reverse direction, removes the force to enable the biasing member 86 to return to its original position and the feet 138 return into the spud slots 77. When the rotatable member is in its first position, the latch 120 snaps into the notch 122 indicating that it is in the first position. To recouple the chuck with the spindle, the spud 62 is slid onto the spindle 24 wherein the chamfered surface of the spindle contacts the biasing member feet 138 spreading the feet 138 apart from one another and enabling them to ride along the spindle 24. As force is continued axially on the chuck 20, the feet 138 contact the spindle recess 26 recoupling the biasing member 86 which, in turn, couples the chuck 20 with the spindle 24.

Figure 8:
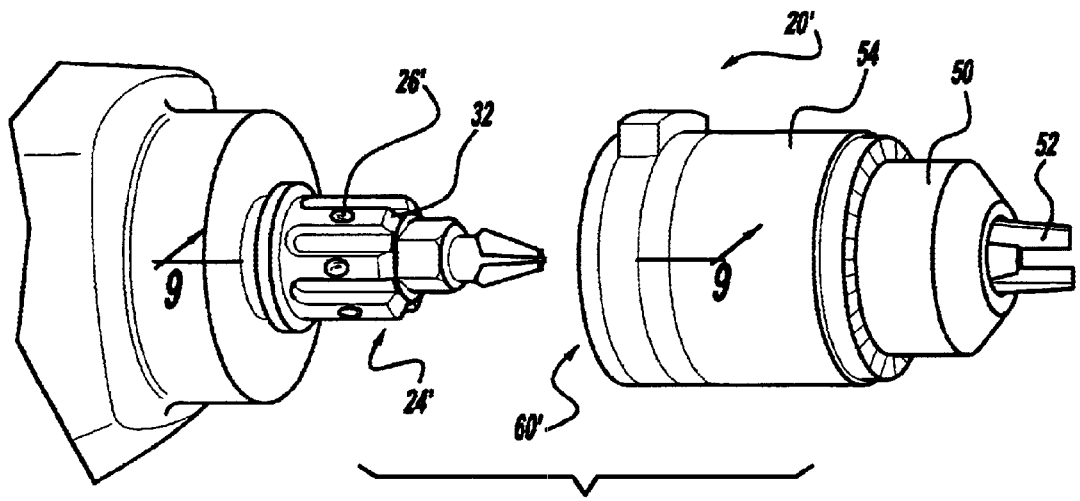
FIG. 8 is a perspective view like FIG. 2 of an alternate embodiment of the present invention.
Figure 9:
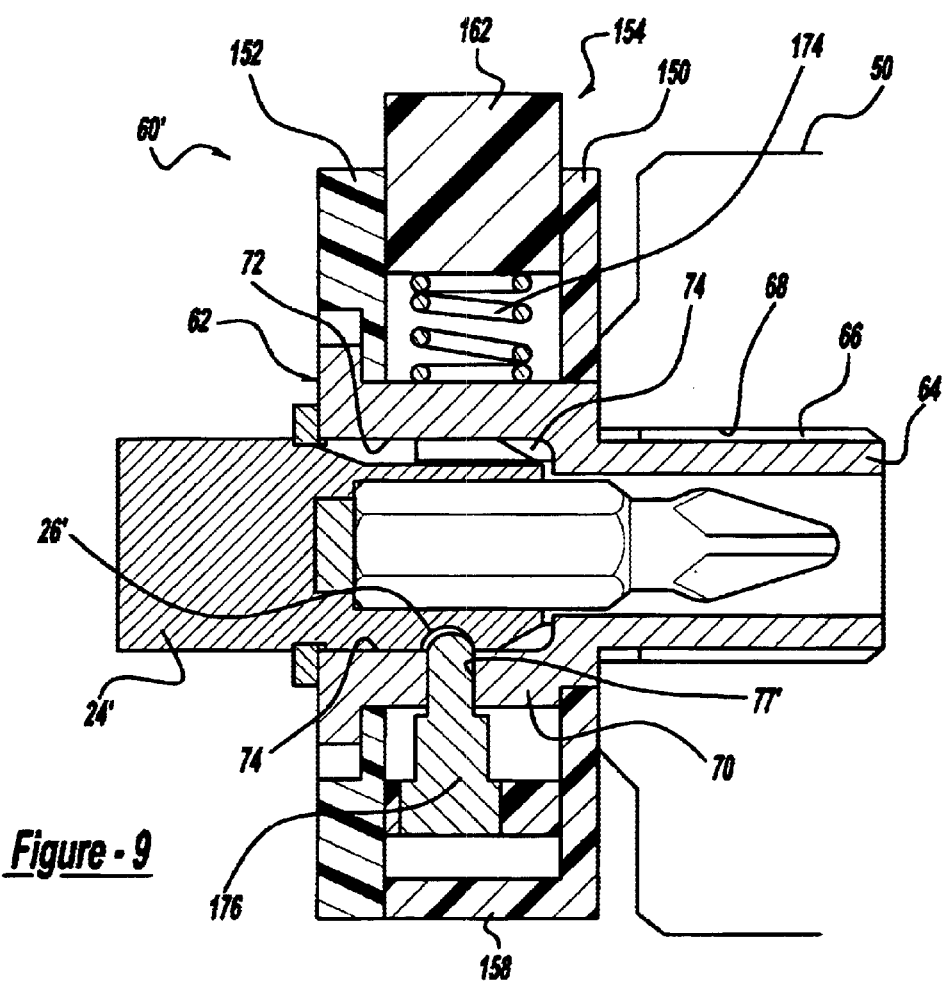
FIG. 9 is a cross-section view of FIG. 8 along line 9—9 thereof in the assembled condition.
Figure 10:
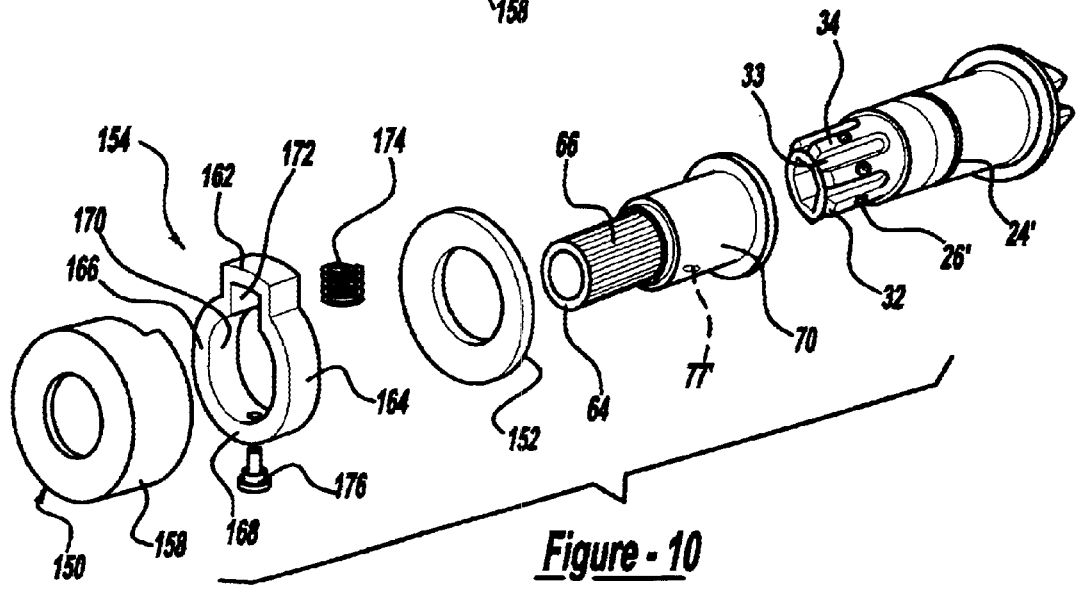
FIG. 10 is an exploded perspective view of the locking member of FIG. 8.

Turning to FIGS. 8–10, an additional embodiment is shown. The elements which are the same will be identified with like numerals. The differences between the removable chucks are in the retention mechanism.

Turning to FIG. 8, the removable chuck 20' includes a body 50, jaw members 52, as well as locking sleeve 54, which are all conventional to retain the drill bit within the chuck 20'. The retaining mechanism 60' is at the rear of the chuck body 50 to enable the chuck to be secured with and removed from the spindle 24'. The spindle 24' is the same as that previously discussed; however, the circumferential groove 26 has been replaced with a plurality of recesses 26' on the raise members 32.

The retention mechanism 60' includes drive spud 62 which includes first tubular portion 64 which may have a thread or the like 66 which is coupled with the threaded bore 68 at the rear of the chuck body 50 to secure the spud with the chuck body 50. The second tubular bore portion 70 of the spud 62 has a bore 72 with corresponding raised members 74 and axial channels 75 on its interior to mate with the spindle 24'. A bore 77' is formed through the second tubular portion to enable a pin to couple the spud 62 with the spindle 24.

The retention mechanism 60' include a pair of housing members 150 and 152 which house a movable yoke 154. The housing members 150 and 152 generally are a flat disc member as well as a cup-shaped cylindrical member including a skirt 158 which houses the yoke 154.

The yoke 154 has an overall oval shape with an activation portion 162, a pair of legs 164 and 166, as well as a bottom web 168 connecting the legs at one end. The yoke 154, which connects the legs 164, 166 at their top, includes a cut-out 170 which has an elongated extension 172. The cut-out extension 172 extends towards the tip of the activation portion 162 of the yoke.

A spring 174 is positioned in the extended cut-out portion 172. The spring biases between the spud and the yoke 154. A pin 176 is mounted in the web portion 168 of the yoke 154. The pin 176 engages the recesses 26' to connect the removable chuck with the recess.

Figure 9A:
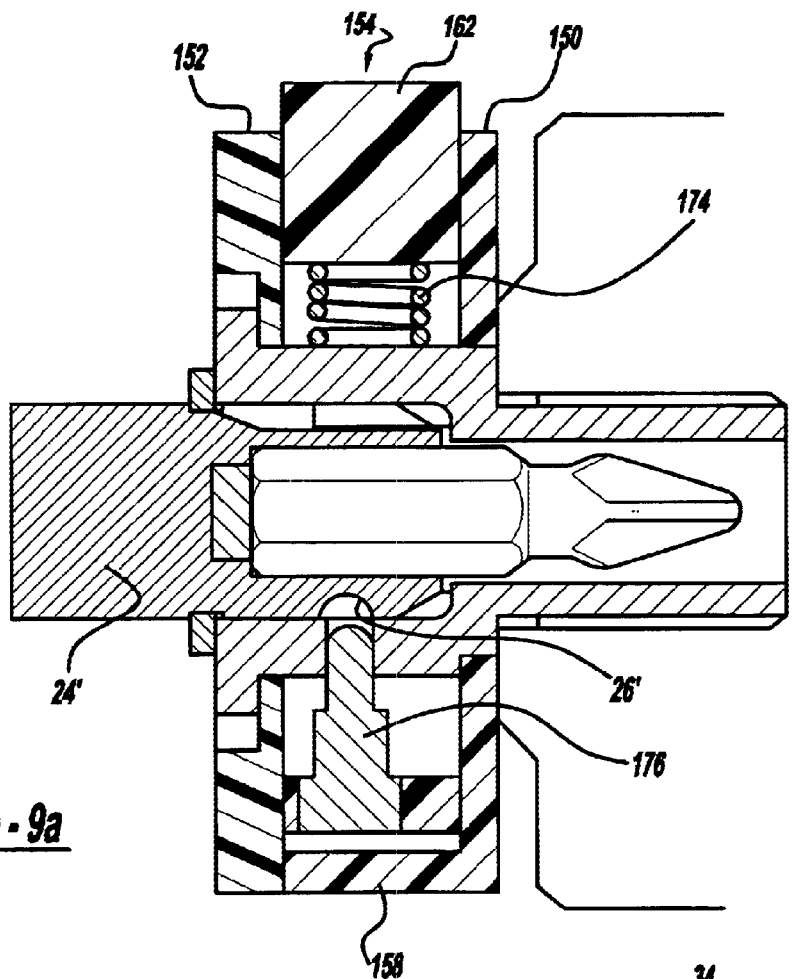
FIG. 9a is the same as FIG. 9 with the yoke depressed.

Once assembled, the removable chuck retention mechanism operates as follows. As seen in FIG. 9, the pin 176 passes through the spud and into one of the recesses 26' of the spindle 24'. The activation portion 162 of the yoke 154 is pushed inward against the spring 174 as seen in FIG. 9a. As this occurs, the pin 176 exits the recess 26'. Thus, the chuck may be removed from the spindle. As the chuck is inserted back onto the spindle, the pin contacts the tapered portion of the extending member riding along the extending member 32 until it contacts the recess 26' wherein the spring forces the pin back into the recess 26'.

Thus, the yoke 154 is moved to compress the spring which, in turn, enables the pin to be removed from the recess 26' in the spindle enabling removal of the chuck.

Turning to FIGS. 11–15, an additional embodiment is shown. The elements which are the same will be identified with like numerals. The differences between the removable chucks are in the retention mechanism.

Figure 11:
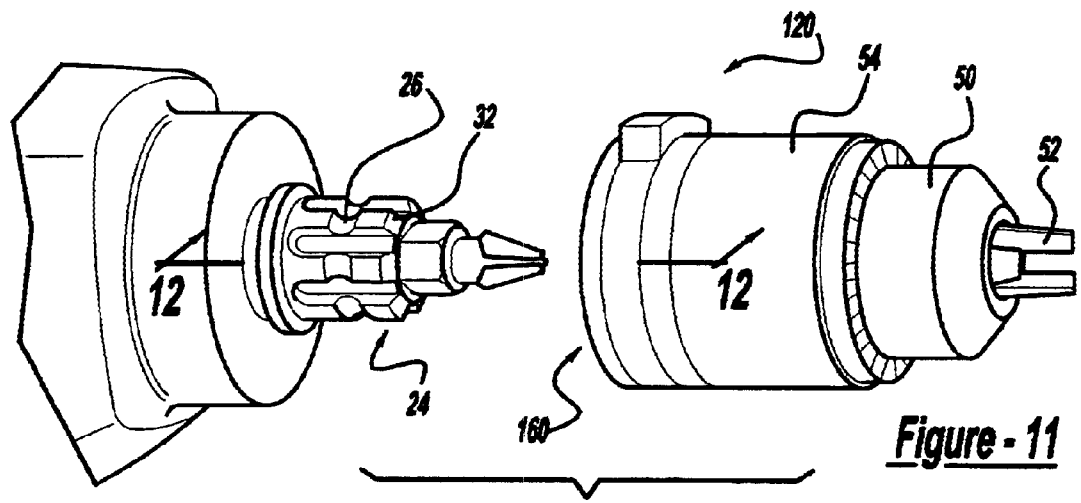
FIG. 11 is an exploded view like FIG. 2 of an alternate embodiment of the present invention.

Turning to FIG. 11, the removable chuck 120 includes a body 50, jaw members 52, as well as locking sleeve 54, which are all conventional to retain the drill bit within the chuck 120. The retaining mechanism 160 is at the rear of the chuck body 50 to enable the chuck to be secured with and removed from the spindle 24.

The retention mechanism 160 includes drive spud 62 which includes first tubular portion 64 which may have a thread or the like 66 which is coupled with the threaded bore 68 at the rear of the chuck body 50 to secure the spud with the chuck body 50. The second tubular bore portion 70 of the spud 62 has a bore 72 with corresponding raised members 74 and axial channels 75 on its interior to mate with the spindle 24. A slot 177 is formed through the second tubular portion 70 to enable a blade to couple the spud 62 with the spindle 24.

The retention mechanism 160 includes a pair of housing members 150 and 152 which house a movable yoke 154. The housing members 150 and 152 generally are a flat disc member as well as a cup-shaped cylindrical member including a skirt 158 which houses the yoke 154. The housing 152 includes tabs which mate with cut outs 80 in the spud 62.

The yoke 154 has an overall oval shape with an activation portion 162, a pair of legs 164 and 166, as well as a bottom web 168 connecting the legs at one end. The yoke 154, which connects the legs 164, 166 at their top, includes a cut-out 170 which has an elongated extension 172. The cut-out extension 172 extends towards the tip of the activation portion 162 of the yoke.

A spring 174 is positioned in the extended cut-out portion 172. The spring biases between the spud and the yoke 154. A blade 176' is mounted in the web portion 168 of the yoke 154. The blade 176' has a curve surface 179 which engages the recess 26 to connect the removable chuck with the recess. The blade 176' also includes a channel 180. A pin 182 passes through a bore 184 in the web 168, through channel 180, to retain the blade 176' on the yoke 154.

Figure 12:
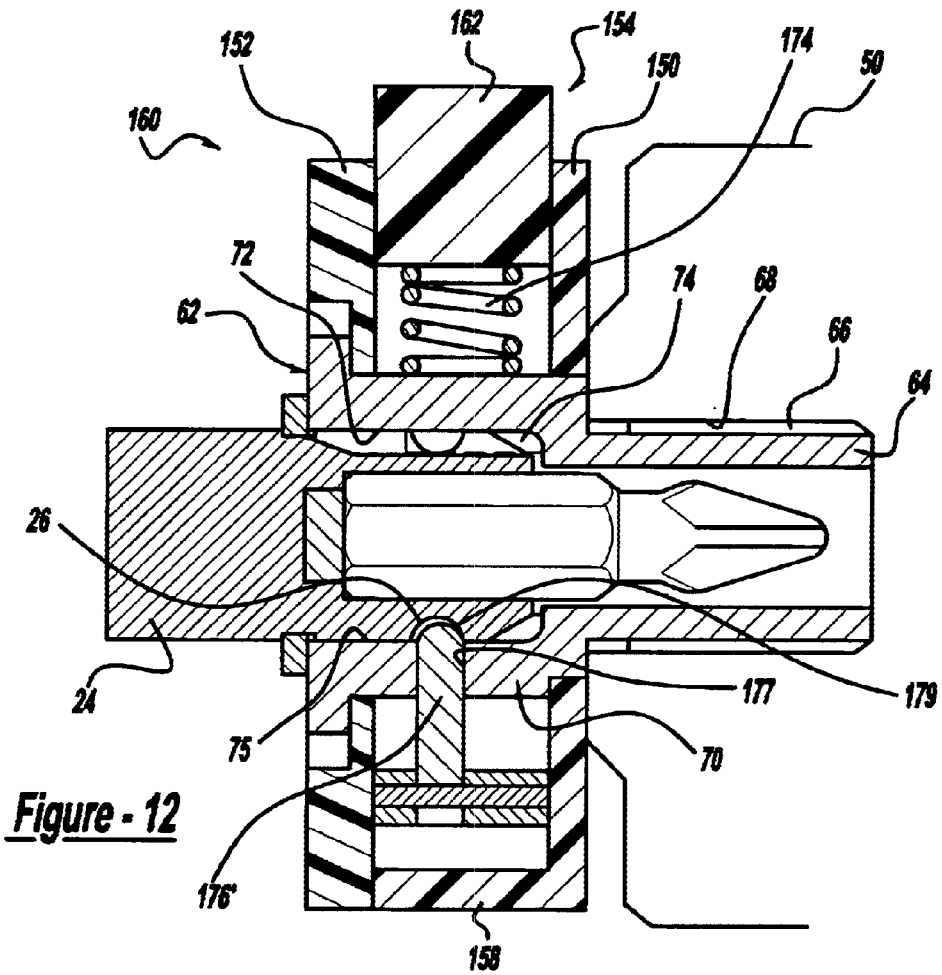
FIG. 12 is a cross-section view of FIG. 11 along line 12—12 in an assembled condition.
Figure 15:
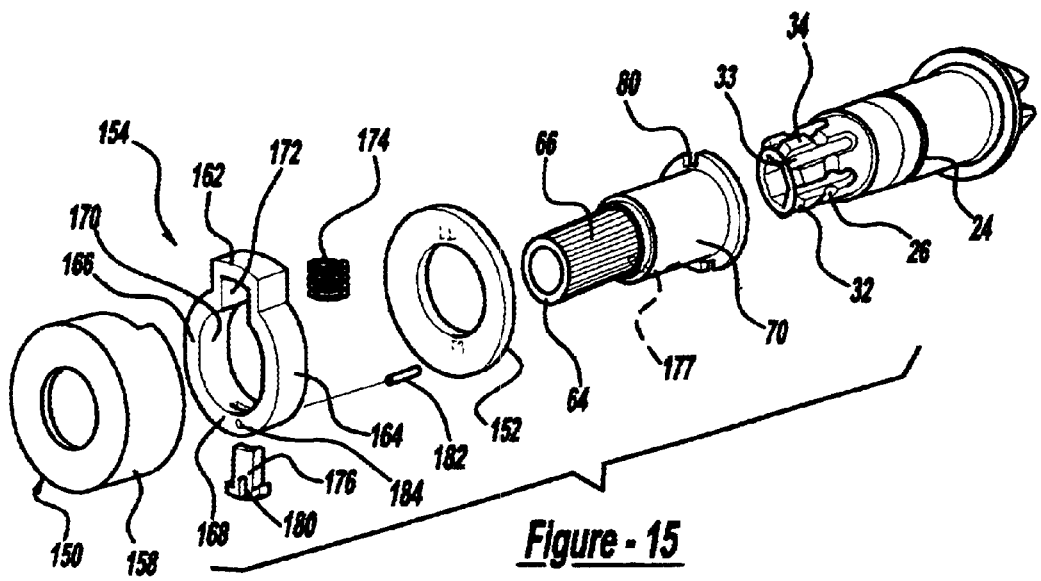
FIG. 15 is an exploded perspective view of the locking member of FIG. 11.

Once assembled, the removable chuck retention mechanism operates as follows. As seen in FIGS. 12 and 14, the blade 176' passes through the spud and into the recesses 26 of the spindle 24. The activation portion 162 of the yoke 154 is pushed inward against the spring 174 as seen in FIG. 13. As this occurs, the blade 176' exits the recess 26. Thus, the chuck 120 may be removed from the spindle. As the chuck is inserted back onto the spindle, the blade contacts the tapered portion of the extending member riding along the extending member 32 until it contacts the recess 26 wherein the spring forces the blade 176' back into the recess 26.

Thus, the yoke 154 is moved to compress the spring which, in turn, enables the blade to be removed from the recess 26 in the spindle enabling removal of the chuck.

Turning to FIGS. 16–20, an additional embodiment is shown. The elements which are the same will be identified with like numerals. The differences between the removable chucks are in the retention mechanism.

Figure 16:
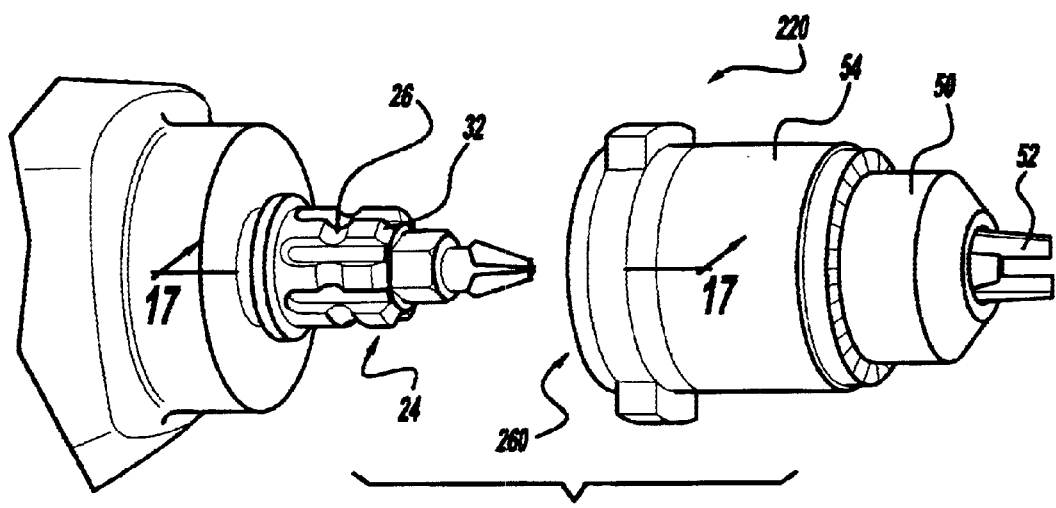
FIG. 16 is an exploded view like FIG. 2 of an alternate embodiment of the present invention.

Turning to FIG. 16, the removable chuck 220 includes a body 50, jaw members 52, as well as locking sleeve 54, which are all conventional to retain the drill bit within the chuck 220. The retaining mechanism 260 is at the rear of the chuck body 50 to enable the chuck to be secured with and removed from the spindle 24.

The retention mechanism 260 includes drive spud 62 which includes first tubular portion 64 which may have a thread or the like 66 which is coupled with the threaded bore 68 at the rear of the chuck body 50 to secure the spud with the chuck body 50. The second tubular bore portion 70 of the spud 62 has a bore 72 with corresponding raised members 74 and axial channels 75 on its interior to mate with the spindle 24. A pair of slots 277 are formed through the second tubular portion to enable blades to couple the spud 62 with the spindle 24.

The retention mechanism 260 includes a pair of housing members 262 and 264 which house a pair of blade carriers 266, 268 and a pair of activation members 270, 272. The housing members 262 and 264 are both cup-shaped cylindrical members with skirts 274 and 276 which houses the blade carriers and actuation members. The housing member 264 may include an annular recess 278 to receive the sleeve 54 of chuck body 50. Housing member 262 includes spring seats 282. Also, housing member 262 includes tabs to mate with cut outs 80 in the spud 62.

The blade carriers 266, 268 have an overall C-shape. Each end 284, 286 includes a cam surface 288, 290. Also, ends 284, 286 include spring housings 292, 294. Springs 296 are positioned in the spring housings 292, 294 and biased between housing bases 298 and spring seats 282. The blade carriers 266, 268 include slots 300 which receive blades 302. The blades 302 include a cut out 304 which receives a pin 306, which extends through bore 308 in the blade carriers 266, 268 to retain the blades 302 in the blade carriers 266, 268. The blades 302 include a curved surface to engage the recess 26 in the spindle 24.

Activation members 270, 272 include a first portion 310 and a second portion 312. The first portion 310 extends outside of the housing members 262, 264 and is activated by the user. The second portion 312 has a V-shape with cam surfaces 314, 316. Cam surfaces 314, 316 contact cam surfaces 288, 290 of the blade carriers 266, 268.

Figure 17:
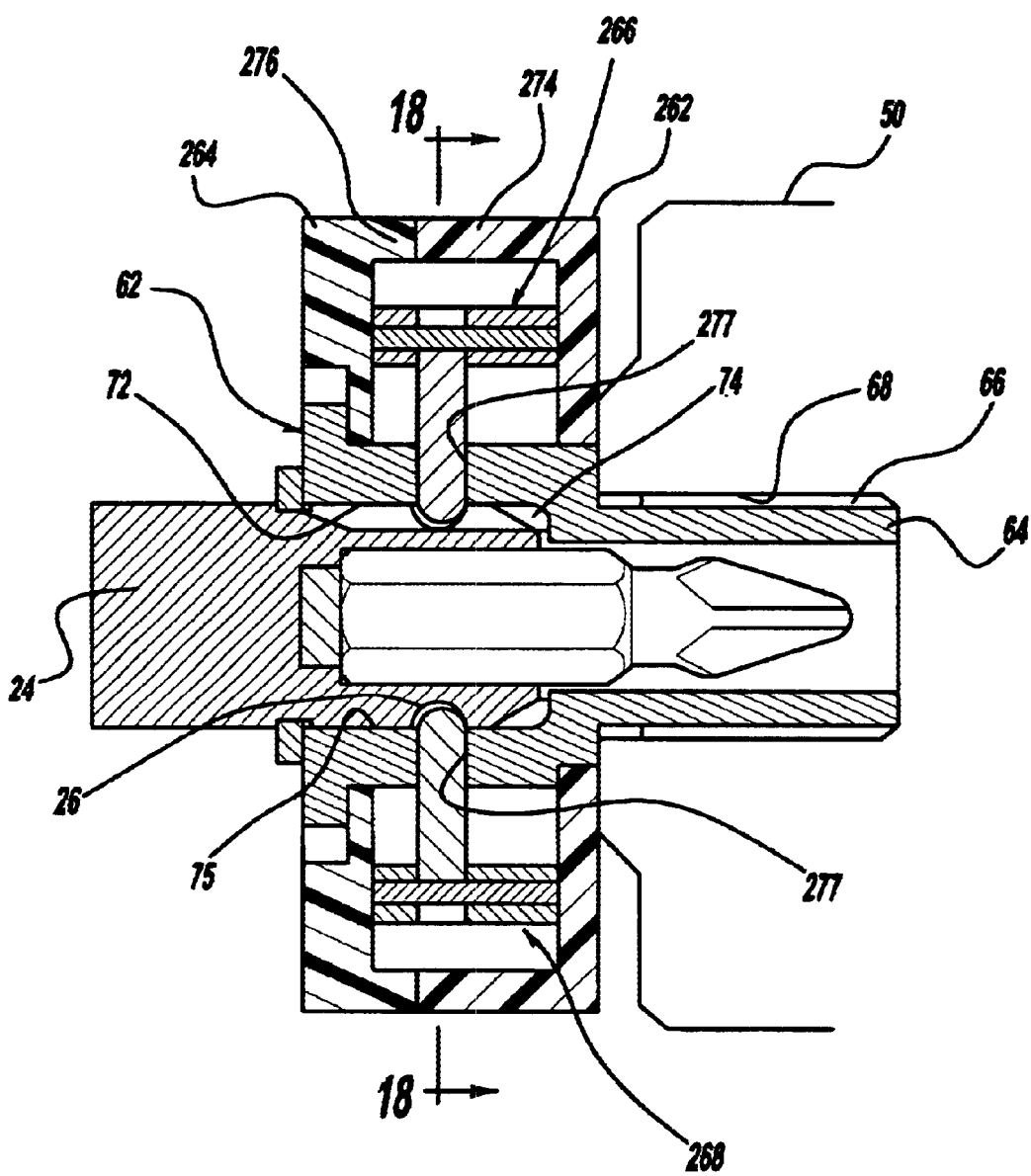
FIG. 17 is a cross-section view of FIG. 16 along line 17—17 in an assembled condition.
Figure 18:
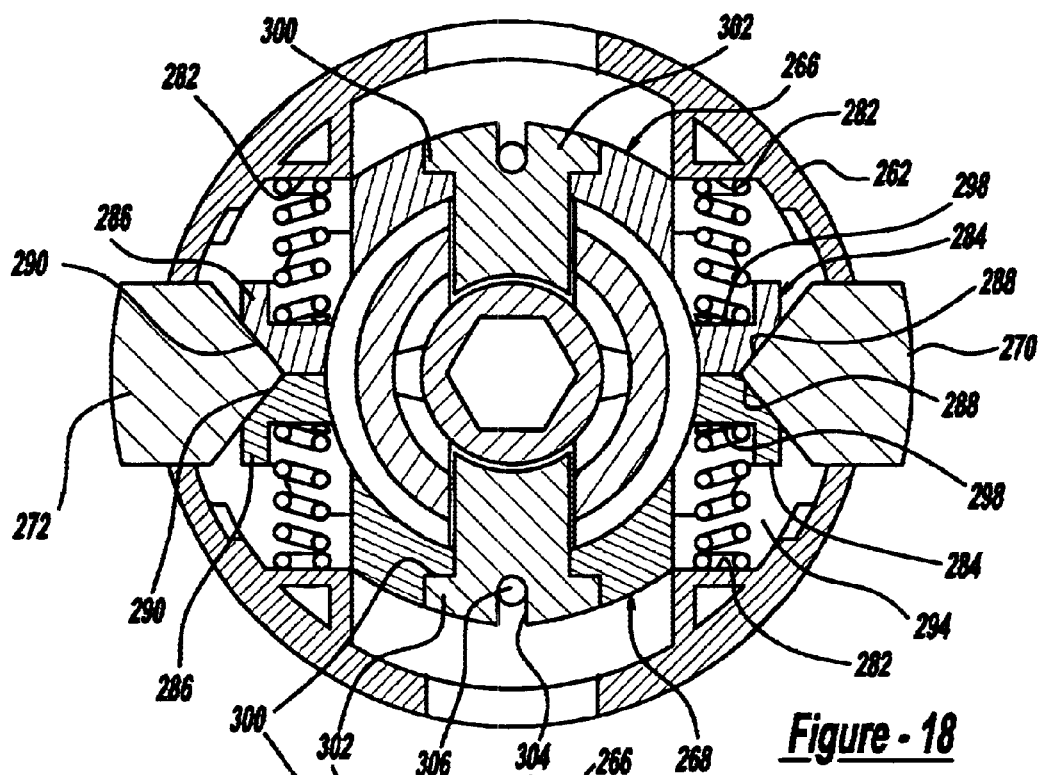
FIG. 18 is a cross-section view of FIG. 15 along line 18—18 with the yoke in a depressed position.
Figure 19:
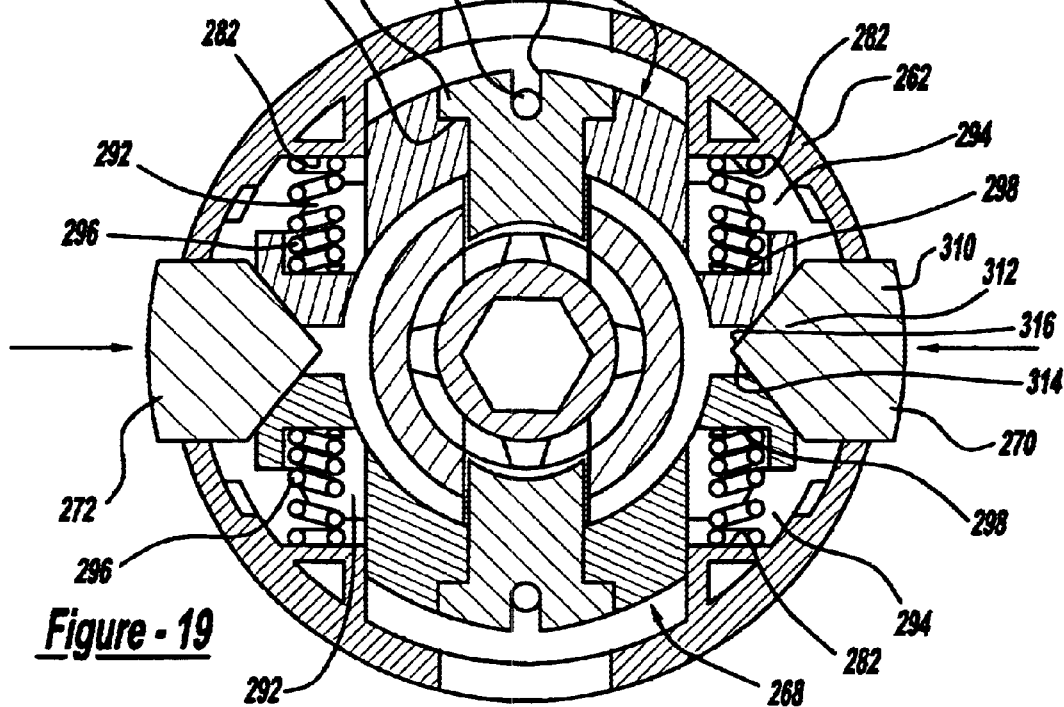
FIG. 19 is a view like FIG. 18 with the yoke in a retention position.
Figure 20:
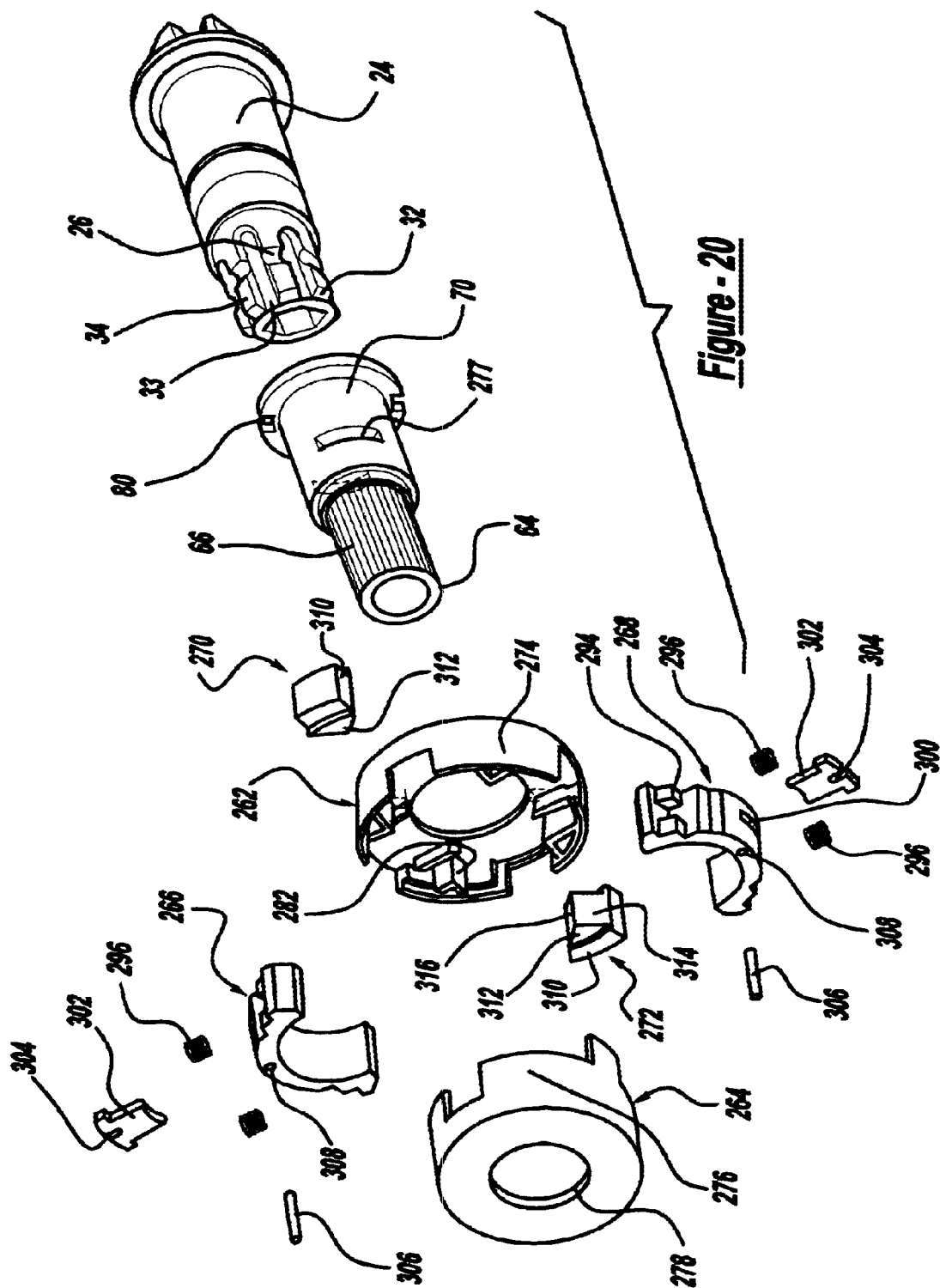
FIG. 20 is an exploded perspective view of the locking member of FIG. 15.

Once assembled, the removable chuck retention mechanism operates as follows. As seen in FIGS. 17–19, the blades 302 pass through the spud and into one of the recess 26 of the spindle 24. The first portions 310 of activation members 270, 272 are pushed inward. Cam surfaces 314, 316 push against cam surfaces 288, 290 of the blade carriers 266, 268. In turn, the blade carriers 266, 268 compress springs 296 between spring seats 282 and 298 as seen in FIG. 19. As this occurs, the blades 302 exit the recess 26. Thus, the chuck may be removed from the spindle. As the chuck is inserted back onto the spindle, the blades 302 contact the tapered portion of the extending member riding along the extending member 32 until it contacts the recess 26 wherein the springs force the blades 302 back into the recess 26.

Thus, the blade carriers 266, 268 are moved to compress the springs which, in turn, enable the blades to be removed from the recess 26 in the spindle enabling removal of the chuck.

While the above detailed description describes the preferred embodiment of the present invention, the invention is susceptible to modification, variation, and alteration without deviating from the scope and fair meaning of the subjoined claims.

What is claimed is:

1. A removable chuck comprising:
    a sleeve for directly connecting with a rotating spindle;
    a chuck coupled with said sleeve, said sleeve coupling said chuck with said rotating spindle;
    said chuck and sleeve being removable from the rotatable spindle and said removable chuck and sleeve being operable to receive or remove tools from said chuck and sleeve when said chuck and sleeve are coupled with the rotating spindle;
    a locking mechanism for retaining said sleeve on the rotating spindle, said locking mechanism comprising at least one locking blade for seating in a recess in the spindle, said at least one locking blade movable from a first position, coupling the sleeve with the spindle recess, to a second position, where said at least one locking blade is out of the spindle recess; and
    said at least one locking blade biasing between said first position, wherein said at least one locking blade being in a non-biased condition, where said sleeve is locked with said spindle, to said second position, where said at least one locking blade being in a biased condition, enabling said sleeve to be removed from the spindle.

2. The removable chuck according to claim 1, wherein said locking mechanism includes a pair of locking blades.

3. The removable chuck according to claim 2, wherein said locking mechanism including a housing, a first and second blade carrier in said housing, said first and second blade carriers each coupled with one of said blades, a pair of activation members coupled with said first and second blade carriers, biasing members for biasing said first and second blade carriers, said pair of activation members moving said first and second blade carriers against said biasing members between said first and second positions for locking and enabling removal of said sleeve from the spindle.

4. The removable chuck according to claim 3, wherein said pair of activation members and said first and second blade carriers each include cam surfaces acting on an opposing cam surface for moving said blades transverse to an axis of said spindle between said first and second positions.

5. The removable chuck according to claim 4, wherein said first and second blade carriers have an overall C-shape.

6. The removable chuck according to claim 4, wherein each activation member has a pair of cam surfaces.

7. The removable chuck according to claim 1, wherein said locking mechanism includes a yoke member coupled with said at least one blade for engaging the recess in said spindle.

8. The removable chuck according to claim 7, wherein said locking mechanism including a spring for moving said yoke member between said first and second positions.

9. The removable chuck according to claim 8, wherein said spring is a helical spring, said spring in a non-biased position maintaining a portion of said yoke accessible to a user.

10. A hand tool comprising:
    a hand tool having a rotatable spindle, said spindle including a recess; and
    a removable chuck, said removable chuck comprising:
        a sleeve for directly connecting with the rotating spindle;
        a chuck coupled with said sleeve, said sleeve coupling said chuck with said rotating spindle and said chuck operable to receive or remove tools when coupled with said sleeve;
        said chuck and sleeve being removable from the rotatable spindle and said removable chuck and sleeve being operable to receive or remove tools from said chuck and sleeve when said chuck and sleeve are coupled with the rotating spindle;
        a locking mechanism for retaining said sleeve on the rotating spindle, said locking mechanism comprising at least one locking blade for seating in a recess in the spindle, said at least one locking blade movable from a first position, coupling the sleeve with the spindle recess, to a second position, where said at least one locking blade is out of the spindle recess; and
        said at least locking blade biasing between said first position, wherein said at least one locking blade being in a non-biased condition, where said sleeve is locked with said spindle, to said second position, where said at least one locking blade being in a biased condition, enabling said sleeve to be removed from the spindle.

11. The hand tool according to claim 10, wherein said locking mechanism including a pair of locking blades.

12. The hand tool according to claim 11, wherein said locking mechanism including a housing, a first and second blade carrier in said housing, said first and second blade carriers each coupled with one of said blades, a pair of activation members coupled with said first and second blade carriers, biasing members for biasing said first and second blade carriers, said pair of activation members moving said first and second blade carriers against said biasing members between said first and second positions for locking and enabling removal of said sleeve from the spindle.

13. The hand tool according to claim 12, wherein said pair of activation members and said first and second blade carriers each include cam surfaces for acting on an opposing cam surface for moving said blades transverse to an axis of said spindle between said first and second positions.

14. The hand tool according to claim 13, wherein said first and second blade carriers have an overall C-shape.

15. The hand tool according to claim 13, wherein each activation member has a pair of cam surfaces.

16. The hand tool according to claim 10, wherein said locking mechanism including a yoke member coupled with said at least one blade for engaging the recess in said spindle.

17. The hand tool according to claim 16, wherein said locking mechanism including a spring for moving said yoke member between said first and second positions.

18. The hand tool chuck according to claim 17, wherein said spring is a helical spring, said spring in a non-biased position maintaining a portion of said yoke accessible to a user.

* * * * *

UNITED STATES PATENT AND TRADEMARK OFFICE
CERTIFICATE OF CORRECTION

PATENT NO. : 6,688,611 B2
DATED : February 10, 2004
INVENTOR(S) : Gifford et al.

It is certified that error appears in the above-identified patent and that said Letters Patent is hereby corrected as shown below:

Column 8,
Line 27, after "least" insert -- one --.
Line 60, delete "chuck".

Signed and Sealed this

Twenty-ninth Day of June, 2004

JON W. DUDAS
*Acting Director of the United States Patent and Trademark Office*